(12) United States Patent
Ito et al.

(10) Patent No.: US 10,146,481 B2
(45) Date of Patent: Dec. 4, 2018

(54) MAGNETIC DISK DEVICE CAPABLE OF PREDICTING THE PROBABILITY OF FAILURE

(71) Applicant: BUFFALO INC., Nagoya-shi (JP)

(72) Inventors: Tsukasa Ito, Nagoya (JP); Tsubasa Tanaka, Nagoya (JP); Suguru Ishii, Nagoya (JP)

(73) Assignee: BUFFALO INC., Nagoya-shi (JP)

( * ) Notice: Subject to any disclaimer, the term of this patent is extended or adjusted under 35 U.S.C. 154(b) by 0 days.

(21) Appl. No.: 15/667,714

(22) Filed: Aug. 3, 2017

(65) Prior Publication Data

US 2018/0039450 A1 Feb. 8, 2018

(30) Foreign Application Priority Data

Aug. 8, 2016 (JP) .................................. 2016-155271

(51) Int. Cl.
*G11B 19/04* (2006.01)
*G06F 3/06* (2006.01)
*G06F 12/14* (2006.01)
*G06F 13/10* (2006.01)
*G06F 21/80* (2013.01)
*G11B 20/12* (2006.01)

(52) U.S. Cl.
CPC ........ *G06F 3/0676* (2013.01); *G06F 12/1408* (2013.01); *G06F 13/102* (2013.01); *G06F 21/80* (2013.01); *G11B 19/041* (2013.01); *G11B 19/046* (2013.01); *G11B 20/1217* (2013.01)

(58) Field of Classification Search
None
See application file for complete search history.

(56) References Cited

U.S. PATENT DOCUMENTS

| 2004/0052045 | A1* | 3/2004 | Botchek | G06F 1/181 |
| | | | | 361/679.21 |
| 2007/0041114 | A1* | 2/2007 | Takahashi | G11B 5/09 |
| | | | | 360/31 |
| 2007/0041118 | A1* | 2/2007 | Takahashi | G11B 5/09 |
| | | | | 360/53 |
| 2015/0380110 | A1* | 12/2015 | Tamura | G06F 11/1076 |
| | | | | 711/103 |
| 2016/0292025 | A1* | 10/2016 | Gupta | G06F 11/076 |

FOREIGN PATENT DOCUMENTS

| JP | 2001-312375 | 11/2001 |
| JP | 3178766 | 9/2012 |
| JP | 3178767 | 9/2012 |

\* cited by examiner

*Primary Examiner* — Tan X Dinh
(74) *Attorney, Agent, or Firm* — Oblon, McClelland, Maier & Neustadt, L.L.P.

(57) ABSTRACT

There is provided a magnetic disk device including a magnetic disk, and circuitry configured to receive a control command for instructing to write data in the magnetic disk or to rear the data from the magnetic disk, perform a data access process of writing the data in the magnetic disk or reading the data from the magnetic disk according to the received control command, specify a data amount of object data of the data access process, calculate a cumulative value of the data amount of the object data from a start of an operation, and perform notification when the cumulative value is equal to or larger than a predetermined threshold.

19 Claims, 8 Drawing Sheets

MAGNETIC DISK DEVICE CAPABLE OF PREDICTING THE PROBABILITY OF FAILURE

CROSS-REFERENCE TO RELATED APPLICATION

This application claims priority from Japanese Patent Application No. 2016-155271, filed on Aug. 8, 2016, the entire subject matter of which is incorporated herein by reference.

TECHNICAL FIELD

The present disclosure relates to a magnetic disk device.

BACKGROUND

There has been proposed a magnetic disk device which includes a hard disk and has a function called Self-Monitoring Analysis and Reporting Technology (S.M.A.R.T.). The device uses the S.M.A.R.T. function to acquire a device operation history, an error history, and the like and performs failure prediction for a device using the acquired history information (see Japanese Patent Application Publication No. 2001-312375, Japanese Utility Model No. 3178766, and Japanese Utility Model No. 3178767). If failure is predicted, the magnetic disk device notify such the result of failure prediction to a user by displaying a warning message on a monitor of a computer connected to the magnetic disk device or turning on or flashing an LED lamp disposed on a casing of the magnetic disk device.

The S.M.A.R.T. function performs a failure prediction based on a frequency of some type of failure which has actually occurred in the magnetic disk device, such as the number of bad sectors subjected to alternative processing, the number of times that sector alternative processing has occurred, or the number of times that seek errors have occurred. Therefore, there is a problem that fatal failure may occur before as a result of failure prediction is obtained indicating that a possibility of fatal failure is high. In this case, a user cannot back up data stored in the magnetic disk device. Further, there is a problem that even in the situation where any fatal failure has not occurred, the user cannot recognize whether a probability of failure in the magnetic disk device is high, i.e., whether it is time to replace the magnetic disk. The above-described problems are not limited to the magnetic disk devices including hard disks and are common to magnetic disk devices including other magnetic disks such as flexible disks and Zip disks. Therefore, it is desired to provide techniques capable of accurately specifying whether a probability of failure in the magnetic disk device is high.

SUMMARY

According to an aspect of the present disclosure, there is provided a magnetic disk device including a magnetic disk, and circuitry. The circuitry is configured to receive a control command for instructing to write data in the magnetic disk or to read the data from the magnetic disk, perform a data access process of writing the data in the magnetic disk or reading the data from the magnetic disk according to the received control command, specify a data amount of object data of the data access process, calculate a cumulative value of the data amount of the object data from the start of an operation, and perform notification when the cumulative value is equal to or larger than a predetermined threshold.

According to another aspect of the present disclosure, there is provided a magnetic disk control device for controlling a magnetic disk device including a magnetic disk. The control device includes circuitry. The circuitry is configured to receive a control command for instructing to write data in the magnetic disk or to read the data from the magnetic disk, perform a data access process of writing the data in the magnetic disk or reading the data from the magnetic disk according to the received control command, specify the data amount of object data of the data access process, calculate the cumulative value of the data amount of the object data from a start of an operation, and perform notification when the cumulative value is equal to or larger than a predetermined threshold.

According to a further aspect of the present disclosure, there is provided a magnetic disk control method of controlling a magnetic disk device including a magnetic disk. The control method includes receiving a control command for instructing to write data in the magnetic disk or to read the data from the magnetic disk, performing a data access process of writing the data in the magnetic disk or reading the data from the magnetic disk according to the received control command, specifying a data amount of object data of the data access process, calculating a cumulative value of the data amount of the object data from a start of an operation, and performing notification when the cumulative value is equal to or larger than a predetermined threshold.

BRIEF DESCRIPTION OF DRAWINGS

The above and other aspects of the present disclosure will become more apparent and more readily appreciated from the following description of embodiments of the present disclosure taken in conjunction with the attached drawings, in which.

DESCRIPTION OF EMBODIMENTS

A. First Embodiment

A1. Device Configuration

Figure 1:
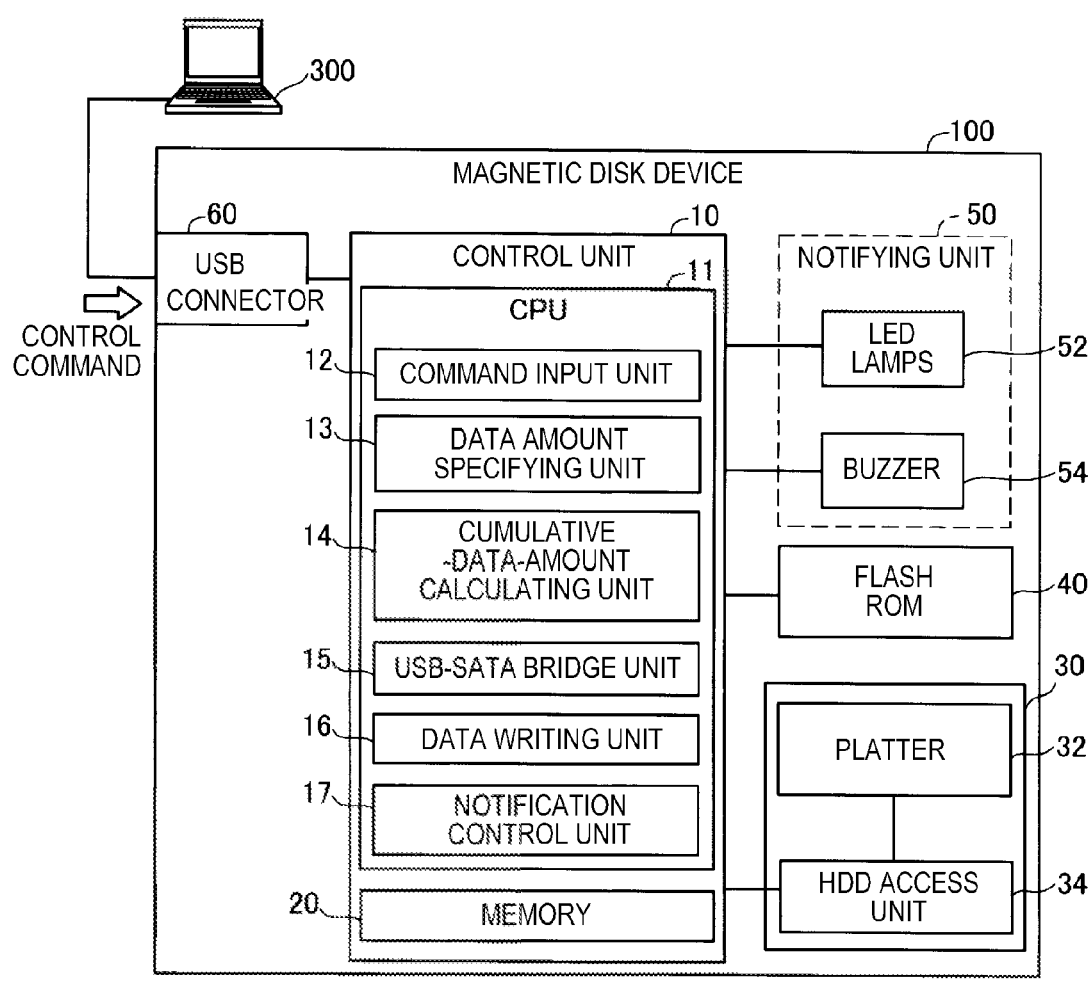
FIG. 1 is a block diagram of a magnetic disk device according to an embodiment of the present disclosure.

FIG. 1 is a block diagram of a magnetic disk device according to a first embodiment of the present disclosure. A magnetic disk device 100 of the first embodiment is applied to a removable hard disk device and is used by being connected to a personal computer 300 via a predetermined external interface. In the present embodiment, this external interface is Universal Serial Bus (USB). However, the external interface is not limited to USB, and other interfaces such as Small Computer System Interface (SCSI), Fibre Channel, Serial Advanced Technology Attachment (SATA), Serial Attached SCSI (SAS), and Local Area Network (LAN) may also be used. An iSCSI protocol may be used together with LAN interface. The personal computer 300 has the same configuration as that of a general personal computer including a USB interface, and thus a detailed description thereof will be omitted.

The magnetic disk device 100 is driven by DC power supplied from an AC/DC adapter (not shown). However, the magnetic disk device 100 may be driven by electric power supplied from the USB interface (i.e. electric power supplied by VBUS), instead of the AC/DC adapter. The magnetic disk device 100 includes a control unit 10, a hard disk (HDD) 30, a hard disk access unit 34, a flash Read Only Memory (ROM) 40 (an example of a storage medium different from a magnetic, disk), a notifying unit 50, and a USB connector 60.

The control unit 10 includes a CPU 11 and a memory 20. The CPU 11 loads a control program stored in the flash ROM 40 into the memory 30 and performs the control program so as to function as a command input unit 12, a data amount specifying unit 13, a cumulative-data-amount calculating unit 14, a USB-SATA bridge unit 15, a data writing unit 16, and a notification control unit 17.

The command input unit 12 performs communication with the personal computer 300 via the USB connector 60 and transmits or receives SCSI commands though the USB communication.

When the magnetic disk device 100 exchanges SCSI commands with the personal computer 300, the data amount specifying unit 13 specifies the amount of data to be transmitted or received together with each command. Precisely, the data amount specifying unit 13 specifies the amount of data to be written in the hard disk 30 (a platter 32 to be described below) or the amount of data to be read from the hard disk 30. Specifically, the data amount specifying unit 13 specifies a setting value stored in a field "TRANSFER LENGTH" (transfer data length) included in each read command or write command defined according to SCSI standard as the amount of data to be transmitted or received.

Hereinafter, the amount of data to be written in the hard disk 30 (the platter 32 described below) and the amount of data to be read from the hard disk 30 will be referred to as workload. The life of the hard disk 30 correlates with the amount of data which is written in the hard disk 30 and the amount of data which is read from the hard disk 30.

The cumulative-data-amount calculating unit 14 integrates values (transfer data amounts) specified by the data amount specifying unit 13 so as to calculate the cumulative value of transfer data amounts from a start of the operation of the magnetic disk device 100 (for example, s start supplying of power first), i.e., the cumulative data amount of workload.

The USB-SATA bridge unit 15 converts interface protocol between USB and SATA. Also, the USB-SATA bridge unit 15 outputs control commands and data, which are obtained by conversion of the interlace protocol, to the hard disk access unit 34 or the USB connector 60. Specifically, the USB-SATA bridge unit 15 converts USB data inputted via the USB connector 60 into SATA data and outputs the SATA data to the hard disk access unit 34. Further, the USB-SATA bridge unit 15 converts SATA data inputted from the hard disk access unit 34 into USB data and outputs the USB data to the USB connector 60.

The data writing unit 16 writes the cumulative value of workload in the flash ROM 40 in a cumulative-value writing process (described below).

The notification control unit 17 controls the notifying unit 50. Specifically, the notification control unit 17 controls the ON/OFF states of LED lamps 52 (described below) and controls the ON/OFF state of a buzzer 54 (described below).

The memory 20 is a so-called main storage device and is configured by a Random Access Memory (RAM) and a Read Only Memory (ROM).

The hard disk 30 includes the platter (an example of a magnetic disk) 32 and the hard disk access unit 34. The hard disk access unit 34 writes data in the flash controller 30 or reads data from the flash controller 30 (hereinafter, referred to as a data access process). Specifically, the hard disk access unit 34 includes a spindle motor for rotating the platter 32, an arm attached with a magnetic head, an actuator for moving the arm, a control circuit for controlling the operation of the actuator, and the like. When a data access process is performed, the arm moves on the platter 32. This movement increases the possibility that foreign materials (contaminations) adhere to the magnetic head and the platter 32, which deteriorates the hard disk 30. Therefore, as described above, the data amount of object data of the data access process, i.e., the amount of data which is written in the platter 32 and the amount of data which is read from the platter 32 correlate with the life of the hard disk 30.

The control program is stored in advance in the flash ROM 40. Further, a cumulative value of workload which is acquired in a "cumulative-value writing process (described below)" is stored in the flash ROM 40.

The notifying unit 50 includes the LED lamps 52 and the buzzer 54. The LED lamps 52 include a green lamp and a red lamp, and these lamps are used to notify the operation state of the magnetic disk device 100. Specifically, a normal state is notified by turning on the green lamp, and a state where the cumulative value of workload is equal to or larger than a threshold is notified by flashing the red lamp. Also, a state where a failure has actually occurred (hereinafter, referred to as a failure state) is notified by turning on the red lamp. The state where the cumulative value of workload is equal to or larger than the threshold means a state where the probability of failure in the magnetic disk device 100 is high. As described above, as workload, i.e., as the amount of object data of the data access process increases, the possibility that foreign materials (contaminations) adhere to the magnetic head and the platter 32 increases, which deteriorates the hard disk 30. Therefore, failure is likely to occur in the magnetic disk device 100. Accordingly, in the present embodiment, the minimum value of the cumulative value of workload, which is obtained in advance by experiments, is set as the threshold in the magnetic disk device 100 in advance. The minimum value means that the probability of failure become high (for example, the failure rate becomes equal to or larger than a predetermined value). Then, in the warning notification process based on workload (to be described below), the state of the magnetic disk device 100 is determined by comparing the cumulative value of workload with the threshold, and if the probability of failure in the magnetic disk device 100 is high, the red lamp is flashed. Similarly to the LED lamps 52, the buzzer 54 also notifies the state of the magnetic disk device 100. The OFF state of the buzzer 54 (i.e., a state where the buzzer does not produce a sound)

means the normal state. The ON state of the buzzer 54 means the state where the cumulative value of workload is equal to or larger than the threshold, or the failure state as described above. The state where the cumulative value of workload is equal to or larger than the threshold and the failure state may be distinguished from each other, for example, by changing intervals and/or tones assigned to those states for the buzzer to sound repeatedly.

The magnetic disk device 100 including the above-described configuration performs the cumulative-value writing process and the warning notification process based on workload so as to notifies accurately a user whether the probability of failure in the magnetic disk device 100 is high.

A2. Cumulative-Value Writing Process

Figure 2:
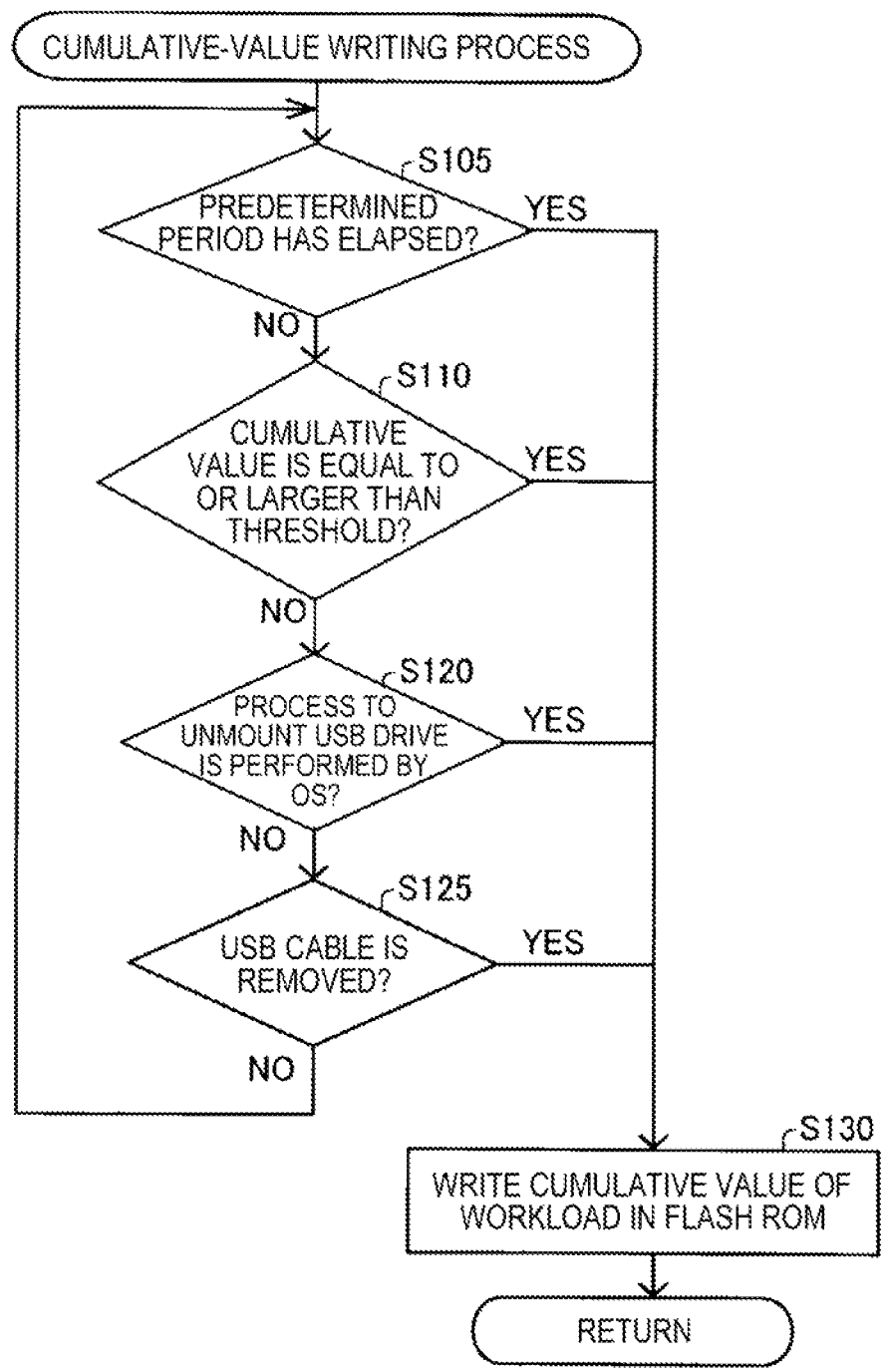
FIG. 2 is a flow chart for explaining the procedure of a cumulative-value writing process which is performed in the magnetic disk device.

FIG. 2 is a flow chart of the procedure of the cumulative-value writing process which is performed in the magnetic disk device 100. The cumulative-value writing process is a process of writing the cumulative value of workload in the flash ROM 40. In the present embodiment, if the magnetic disk device 100 is powered on and the magnetic disk device 100 is booted, the cumulative-value writing process is performed.

In STEP S105, the data writing unit 16 determines whether a predetermined period has elapsed. If it is determined that the predetermined period has elapsed ("YES" in STEP S105), in STEP S130, the data writing unit 16 writes the cumulative value of workload in the flash ROM 40. As the predetermined period, an arbitrary length such as ten minutes, one hour, one day, or one month may be set. The cumulative value of workload is stored in the memory 20 in the warning notification process based on workload (to be described below), so that, in STEP S130, the data writing unit 16 reads the cumulative value of workload from the memory 20 and writes the cumulative value of workload in the flash ROM 40. The reason why the cumulative value of workload is written in the flash ROM 40 is that the cumulative value of workload can be read even if the hard disk 30 fails. Therefore, the cumulative value of workload can be read and used as a clue for specifying the cause of the failure of the hard disk 30. If STEP S130 is completed, the procedure returns to STEP S105.

In STEP S105, if it is determined that the predetermined period has not elapsed from the power-on ("NO" in STEP S105), in STEP S110, the cumulative-data-amount calculating unit 14 determines whether the cumulative value of workload is equal to or larger than a threshold. The threshold which is used in STEP S110 is the above-mentioned threshold. In other words, the threshold is a value obtained by experiments and set in advance on the condition that if the cumulative value of workload is equal to or larger than the threshold, the probability of failure in the magnetic disk device 100 is high.

If it is determined that the cumulative value of workload is equal to or larger than the threshold ("YES" in STEP S110), STEP S130 is performed. In contrast, if it is determined that the cumulative value of workload is smaller than the threshold ("NO" in STEP S110), in STEP S120, the data writing unit 16 determines whether a process to unmount USB drive is performed by the operating system (OS) of the personal computer 300. Whether a process to unmount USB drive is performed by the OS can be specified based on whether a command for a process to unmount USB drive is received from the personal computer 300. If it is determined that a process to unmount USB drive is performed by the OS ("YES" in STEP S120), STEP S130 is performed. In contrast, if it is determined that any process to unmount USB drive are not performed by the OS ("NO" in STEP S120), in STEP S125, the data writing unit 16 determines whether a USB cable is removed from the USB connector 60. Whether a USB cable is removed can be detected from the state of the USB connector 60.

If it is determined that a USB cable is removed ("YES" in STEP S125), STEP S130 is performed. In contrast, if it is determined that any USB cable is not removed ("NO" in STEP S125), the procedure returns to STEP S105.

That is, in the cumulative-value writing process of the present embodiment, at the timing when the predetermined period has elapsed, the timing when the cumulative value of workload becomes equal to or larger than the threshold, the timing when a USB removal process is performed by the OS, and the timing when a USB cable is removed, the cumulative value of workload is written in the flash ROM 40. The above-described each timing is a broad concept including not only "just at that moment" and but also "within a short period from that moment".

A3. Warning Notification Process Based on Workload

Figure 3:
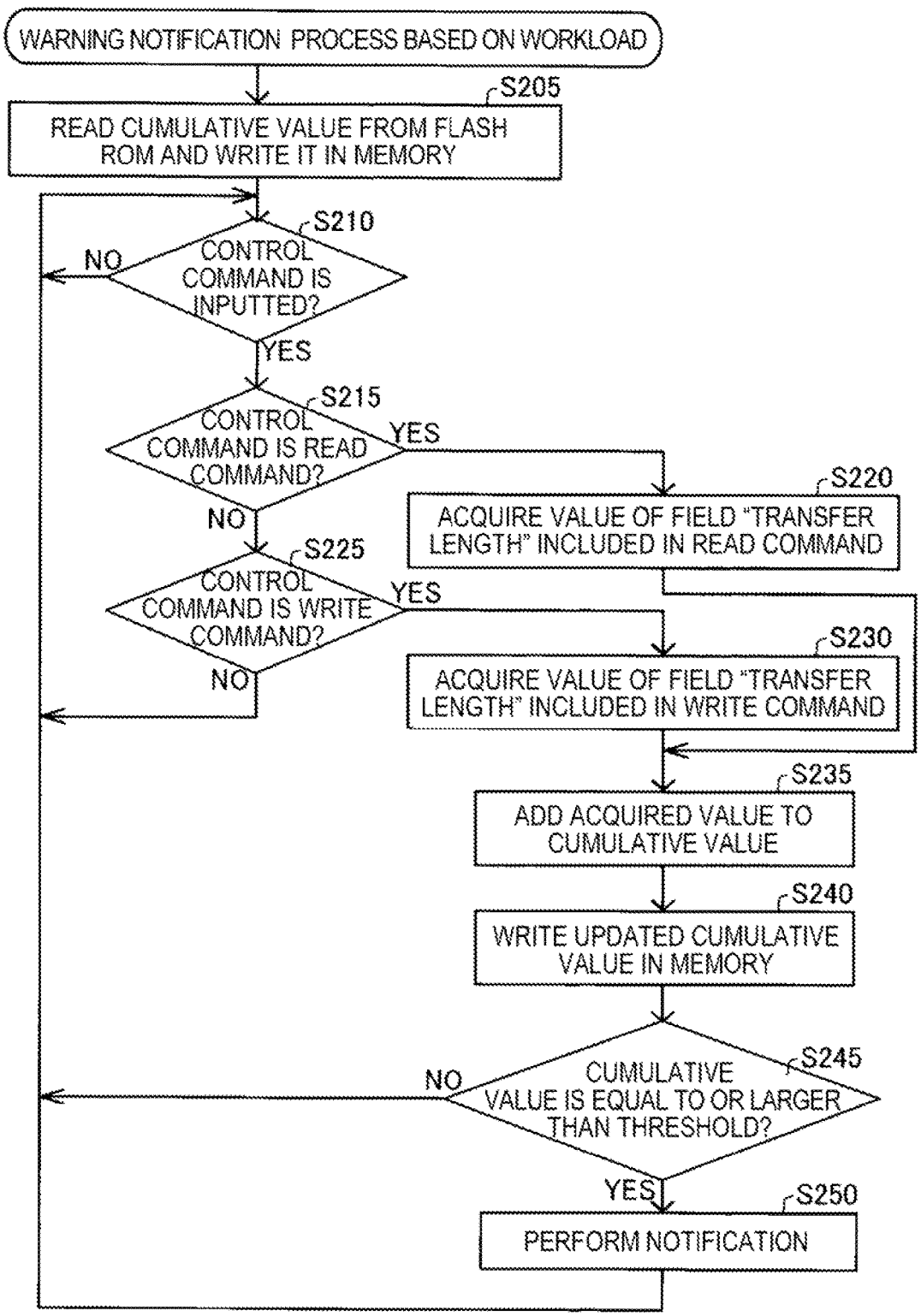
FIG. 3 is a flow chart for explaining the procedure of a warning notification process which is performed based on workload according to a first embodiment.

FIG. 3 is a flow chart for explaining the procedure of the warning notification process which is performed based on workload according to the first embodiment. If the magnetic disk device 100 is powered on and the magnetic disk device 100 is booted, the warning notification process based on workload is performed. The warning notification process based on workload is performed in parallel to the above-described cumulative-value writing process.

In STEP S205, the data writing unit 16 reads the cumulative value of workload from the flash ROM 40 and writes it in the memory 20. In STEP S210, the command input unit 12 determines whether any control command is inputted from the personal computer 300. If it is determined that any control command is not inputted ("NO" in STEP S210), the command input unit performs STEP S210 again. In contrast, if it is determined that a control command is inputted ("YES" in STEP S210), in STEP S215, the command input unit 12 determines whether the inputted control command is a read command. If it is determined that the inputted control command is a read command ("YES" in STEP S215), in STEP S220, the data amount specifying unit 13 acquires the value of the field "TRANSFER LENGTH" included in the read command.

If it is determined in STEP S215 that the inputted control command is not a read command. ("NO" in STEP S215), in STEP S225, the command input unit 12 determines whether the inputted control command is a write command. If it is determined that the inputted control command is not a write command ("NO" in STEP S225), the procedure returns to STEP S210. In contrast, if it is determined that the inputted control command is a write command ("YES" in STEP S225), in STEP S230, the data amount specifying unit 13 acquires the value of the field "TRANSFER LENGTH" included in the write command.

After STEP S220 or STEP S230 is completed, in STEP S235, the cumulative-data-amount calculating unit 14 performs updating by adding the value acquired (specified) in STEP S220, i.e., the amount of data to be read from the hard disk 30, or the value acquired (specified) in STEP S230, i.e., the amount of data to be written in the hard disk 30. Then, in STEP S240, the cumulative-data-amount calculating unit 14 overwrites the updated cumulative value. When STEP S240 is performed for the first time, the cumulative value read in STEP S205 is overwritten.

Subsequently, in STEP S245, the cumulative-data-amount calculating unit 14 determines whether the cumulative value of workload updated in STEP S235 is equal to or larger than a threshold. The threshold which is used in STEP S245 is the above-mentioned threshold. In other words, the threshold is a value obtained by experiments and set in advance and is such a threshold that if the cumulative value of workload is equal to or larger than the threshold, the probability of failure in the magnetic disk device 100 is high.

If it is determined that the cumulative value of workload is equal to or larger than the threshold ("YES" in STEP S245), in STEP S250, the notification control unit 17 performs notification by controlling the notifying unit 50. This notification means the state where the cumulative value of workload is equal to or larger than the threshold, i.e., the state where the probability of failure in the magnetic disk device 100 is high. Specifically, the notification control unit 17 flashes the red lamp included in the LED lamps 52 and turns on the buzzer 54 to notify the above-described state using the buzzer sound. Therefore, the user can easily and accurately specify the state where the probability of failure in the magnetic disk device 100 is high based on flashing of the red lamp and the buzzer sound.

If it is determined in STEP S245 that the cumulative value of workload is smaller than the threshold ("NO" in STEP S245), the procedure returns to STEP S210.

The magnetic disk device 100 of the first embodiment performs notification using the LED lamps 52 and the buzzer 54 if the cumulative value of workload (the data amount of object data of the data access process) equal to or larger than the threshold. Therefore, if receiving such notification, the user can accurately specify the state where the probability of failure in the magnetic disk device 100 is high. In other words, if the user does not receive such notification, the user can specify the state where the probability of failure in the magnetic disk device 100 is not high. As described above, the amount of data which is written in the platter 32 and the amount of data which is read from the platter 32 correlate with the life of the hard disk 30. Therefore, the state where the cumulative value of the data amount of object data is equal to or larger than the threshold represents the situation where the degree of contamination adhering to the platter 32 and the hard disk access unit 34 is equal to or higher than a certain degree and thus the probability of failure is high. Therefore, if receiving the above-described notification, the user can accurately specify the state where the probability of failure in the magnetic disk device 100 is high.

Also, since the data amount of object data is specified based on the value of the field "TRANSFER LENGTH" included in the control command transmitted from the personal computer 300, the corresponding data amount can be easily specified. Therefore, the data amount of object data can be specified in a short time with a low load.

B. Second Embodiment

Figure 4:
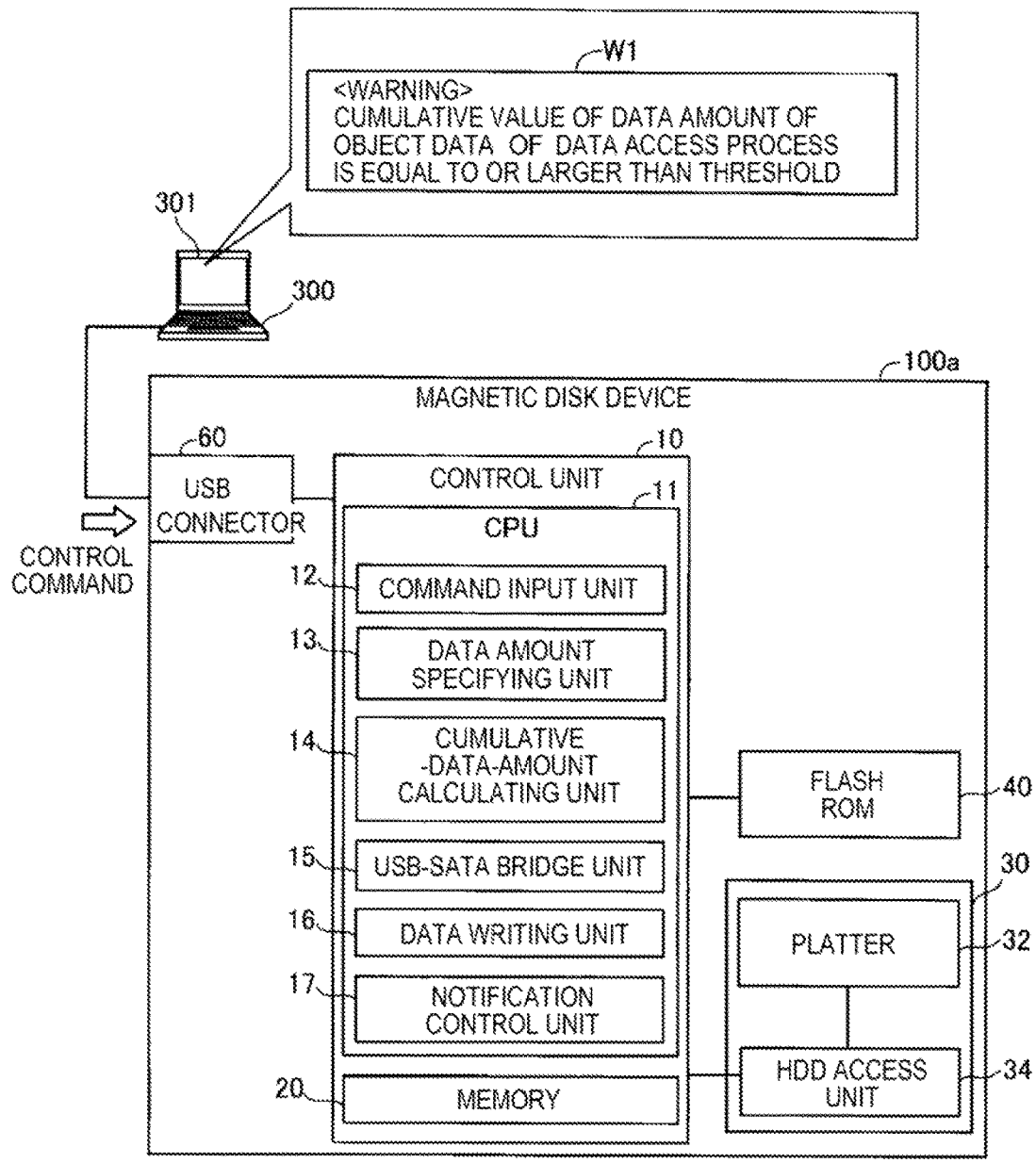
FIG. 4 is a block diagram of a magnetic disk device according to a second embodiment of the present disclosure.

FIG. 4 is a block diagram of a magnetic disk device 100a according to a second embodiment of the present disclosure. The magnetic disk device 100a of the second embodiment is different from the magnetic disk device 100 of the first embodiment in that the magnetic disk device 100a does not include the notifying unit 50. And a notification control unit 17 performs a process different from that of the magnetic disk device 100 of the first embodiment. The other part of the configuration of the magnetic disk device 100a of the second embodiment is similar to that of the magnetic disk device 100 of the first embodiment. Therefore, components similar to those of the first embodiment are denoted by the same reference symbols, and a detailed description thereof will be omitted.

If the cumulative value of workload is equal to or larger than the threshold, when a request command for checking whether the workload exceeds the threshold is received from the personal computer 300, the notification control unit 17 transmits a response including at least either one of information representing that the workload exceeds the threshold or the cumulative value of workload, to personal computer 300 via the USB connector 60. This process corresponds to STEP S250 of a warning notification process which is performed based on workload in the second embodiment. Meanwhile, the other part of the procedure of the warning notification process which is performed based on workload a in the second embodiment and the procedure of a cumulative-value writing process in the second embodiment are similar to those of the first embodiment, respectively, and therefore, a detailed description thereof will be omitted.

If the personal computer 300 receives the response from the magnetic disk device 100a, the personal computer 300 displays a new window W1 on a monitor device 301 based on the received response and displays a warning message in the displayed window W1. Meanwhile, when the cumulative value of workload is included in the response, and if the cumulative value is equal to or larger than the threshold as a result of comparing the cumulative value with the above-mentioned threshold, the personal computer 300 may display a warning message in the window W1. In the example of FIG. 4, a warning message "CUMULATIVE VALUE OF DATA AMOUNT OF OBJECT DATA OF DATA ACCESS PROCESS IS EQUAL TO OR LARGER THAN THRESHOLD" is displayed on the window W1. So the user can easily and accurately recognize the state where the probability of failure in the magnetic disk device 100a is high.

The magnetic disk device 100a of the second embodiment has the same effects as those of the magnetic disk device 100 of the first embodiment. Further, since a warning message is displayed on the monitor device 301 connected to the personal computer 300, the user can recognize early the state where the probability of failure in the magnetic disk device 100a is high.

C. Third Embodiment

Figure 5:
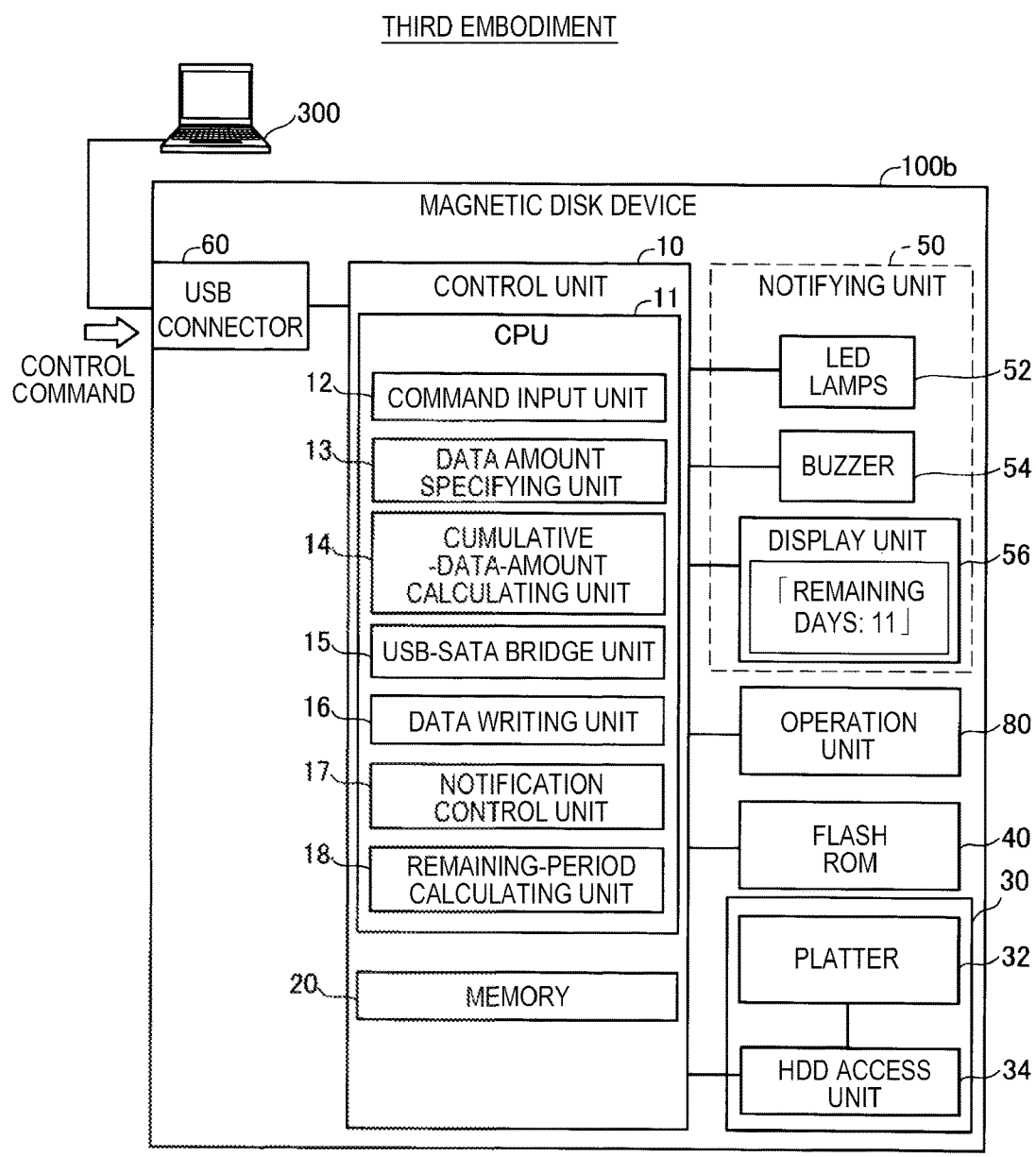
FIG. 5 is a block diagram illustrating a magnetic disk device according to a third embodiment of the present disclosure.

FIG. 5 is a block diagram of a magnetic disk device 100b according to a third embodiment of the present disclosure. The magnetic disk device 100b of the third embodiment is different from the magnetic disk device 100 of the first embodiment in that the CPU 11 functions as a remaining-period calculating unit 18, and a notifying unit 50 further includes a display unit 56, and the magnetic disk device 100b further includes an operation unit 80. The other part of the configuration of the magnetic disk device 100b of the third embodiment is similar to that of the magnetic disk device 100 of the first embodiment. Therefore, components similar to those of the first embodiment are denoted by the same reference symbols, and a detailed description thereof will be omitted.

The remaining-period calculating unit 18 calculates the number of days remaining until the cumulative value of workload will be equal to or larger than the threshold (hereinafter, referred to as remaining days). Specifically, the remaining-period calculating unit 18 calculates the daily average of a cumulative-value, and divides the difference between the current cumulative value and the threshold by the daily average so as to calculate the remaining days. For example, each time when the cumulative value is updated, remaining-period calculating unit 18 may store the daily average of a cumulative-value in the flash ROM 40 in association with the updated cumulative value and the update date and time, and calculate the daily average of the cumulative values by dividing the total cumulative value by the number of days.

The display unit 56 is disposed on the front surface of the casing of the magnetic disk device 100b and displays information representing the remaining days in addition to various menu screens. In the example of FIG. 5, a character string "REMAINING DAYS: 11" is displayed. Also, if the magnetic disk is not replaced although the last day of the remaining day has elapsed, a negative value may be displayed as the remaining days. In this way, the magnetic disk device 100b may notify how many days have elapsed from the date recommended for replacing the magnetic disk. The operation unit 80 includes push buttons and so on and is operated by the user in order to perform a transition among various menu screens and set various values on the magnetic disk device 100b. For example, the user can operate the operation unit 80 in order to display a menu screen for designating a timing to start to display the remaining days on the display unit 56 and designate a timing to start display of the remaining days.

Figure 6:
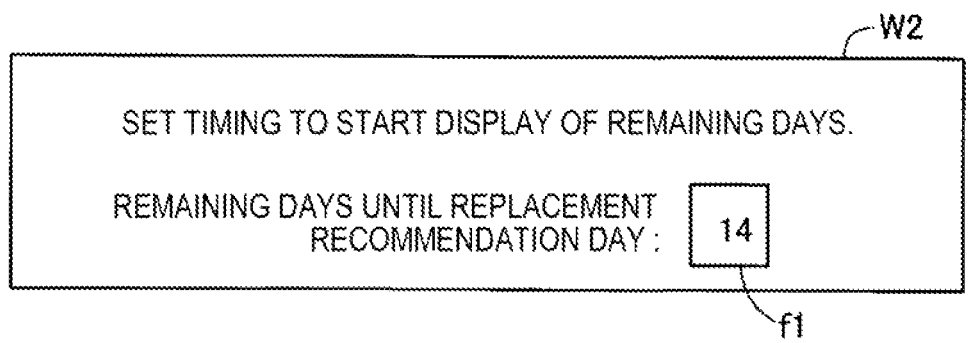
FIG. 6 illustrates an example of a menu screen for setting a timing to start display of remaining days.

FIG. 6 illustrates an example of a menu screen W2 for setting a timing to start display of the remaining days. The user can control the display unit 56 such that the display unit 56 displays the menu screen W2 for setting a timing to start display of the remaining, days by operating the operation unit 80. On the menu screen W2 for setting a timing to start display of the remaining days, a character string "DESIGNATE TIMING TO START DISPLAY OF REMAINING DAYS" and a designation frame f1 for designating a timing are displayed. The designation frame f1 is disposed next to a character string "REMAINING DAYS UNTIL REPLACEMENT RECOMMENDATION DAY:". In the present embodiment, a day when the cumulative value of workload will be equal to or larger than the threshold for the first tune is notified as a replacement recommendation day to the user. If the cumulative value of workload exceeds the threshold (a case where the cumulative value has become larger than the threshold), since the probability of failure in the magnetic disk device 100b is high, it is preferable to replace the magnetic disk device 100b at the timing when the cumulative value of workload becomes equal to or larger than the threshold for the first time. The user can set a timing to start display of the remaining days in the designation frame f1 by operating the operation unit 80. For example, if the user wants the display unit 56 to display the remaining days when the remaining days becomes 14, as shown in FIG. 6, the user can set "14" in the designation frame f1. The timing set to start display of the remaining days is stored in the flash ROM 40.

Figure 7:
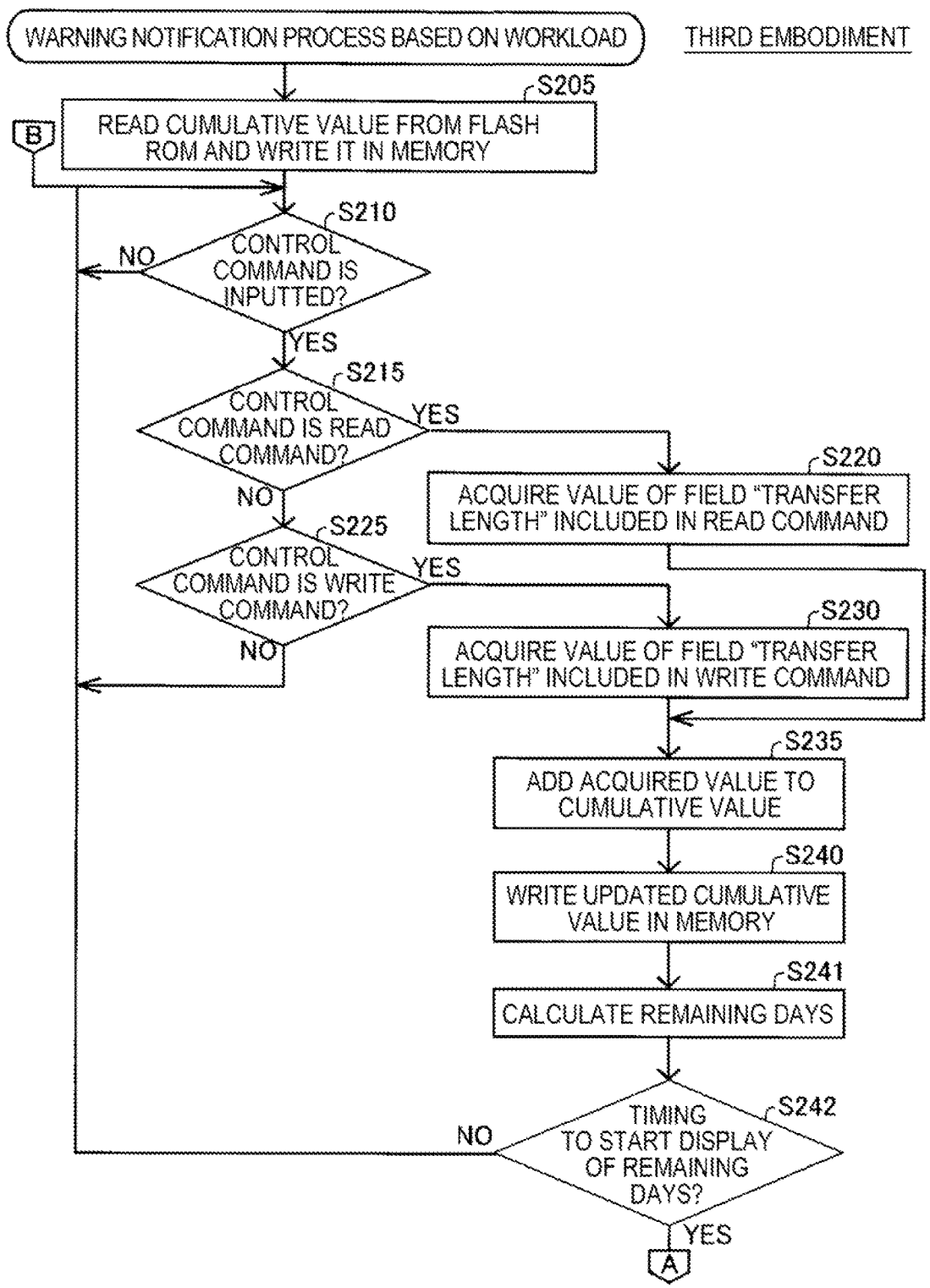
FIG. 7 is a flow chart for explaining the procedure of a warning notification process which is performed based on workload according to the third embodiment.
Figure 8:
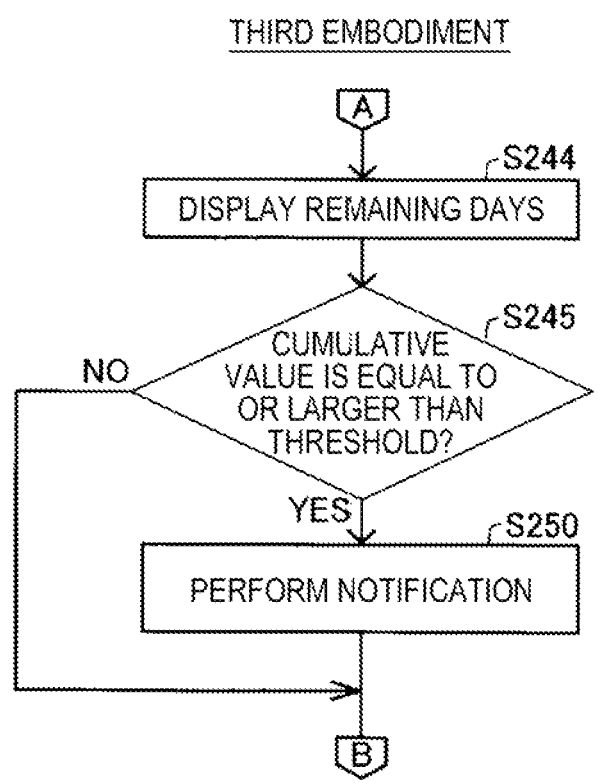
FIG. 8 is a flow chart for explaining the procedure of the warning notification process which is performed based on workload according to the third embodiment, as an additional part of FIG. 7.

FIGS. 7 and 8 are flow charts for explaining the procedure of a warning notification process which is performed based on workload according to the third embodiment. The flow chart of FIG. 7 and the flow chart of FIG. 8 are sequentially performed. The warning notification process which is performed based on workload according to the third embodiment is different from the warning notification process of FIG. 3 which is performed based on workload according to the first embodiment in that STEPS S241, S242, and S244 are added. The other part of the procedure of the warning notification process which is performed based on workload according to the third embodiment is similar to that of the procedure of the warning notification process which is performed based on workload according to the first embodiment. Therefore, steps similar to those of the first embodiment are denoted by the same reference symbols, and a detailed description thereof will be omitted.

As shown in FIG. 7, after the cumulative value of workload is written in the memory 20 (STEP S240 is completed), in STEP S241, the remaining-period calculating unit 18 calculates the remaining days. Subsequently, in STEP S242, the remaining-period calculating unit 18 determines whether the remaining days calculated in STEP S241 reaches the timing designated to start display of the remaining days by the user. If it is determined that the remaining days does not reach the timing to start display of the remaining days ("NO" in STEP S242), the procedure returns to STEP S210. In contrast, if it is determined that the remaining days reaches the timing to start display of the remaining days ("YES" in STEP S242), as shown in FIG. 8, in STEP S244, the remaining-period calculating unit 18 displays the remaining days on the display unit 56. Based on the remaining days displayed on the display unit 56, the user can recognize the timing when the workload will be equal to or larger than the threshold, i.e., the timing when the probability of failure in the magnetic disk device 100 will be high, in advance. Therefore, the administrator of the magnetic disk device 100b can prepare to replace the magnetic disk, such as preparing a magnetic disk device for replacement, notifying the replacement of the magnetic disk device 100b to other users in advance, and perform backup. After STEP S244 is completed, STEP S245 is performed.

The magnetic disk device 100b of the third embodiment has the same effects as those of the magnetic disk device 100 of the first embodiment. Further, since the remaining days until the cumulative value will be equal to or larger than the threshold is displayed by the display unit 56, the user can recognize the remaining days based on the display. Therefore, the user can recognize the timing when the probability of failure in the magnetic disk device 100b will be high, in advance, and thus, for example, can prepare a magnetic disk device for replacement, in advance when the cumulative value will reach the threshold. Therefore, this configuration improves convenience for user. Also, since the user can designate a timing to start display of the remaining days by the display unit 56 (the menu screen W2 for setting a timing to start display of the remaining days) and the operation unit 80, the magnetic disk device 100b is not required to continue displaying the remaining days for a long period unless a lot of days remains, and thus it is possible to emphasize the situation where it is preferable to perform work such as preparing a magnetic disk for replacement and so on.

D. Modifications

D1. First Modification

In each embodiment, the cumulative value of workload is calculated based on the value of a field "TRANSFER LENGTH" of a control command. However, the present disclosure is not limited thereto. For example, the cumulative value of workload may be calculated from the amount of data actually read from or written in the platter 32 by the hard disk access unit 34. Specifically, for example, in the configuration where the magnetic disk device 100, 100a, or 100b has the Self-Monitoring Analysis and Reporting Technology (S.M.A.R.T.) function, the amount of data, which are actually processed by the data access process and are detected by the S.M.A.R.T. function, may be used as the cumulative value of workload. Also, for example, in the configuration where the operating system (OS) of the personal computer 300 measures the amount of data which is written in the magnetic disk device 100, 100a, or 100b and the amount of data which is read from the magnetic disk device 100, 100a, or 100b, and stores the amounts of data, the magnetic disk device 100, 100a, or 100b may acquire the amount of data from the personal computer 300 and used the amount of data to calculate the cumulative value of workload. Also, for example, time for which the data access process is performed may be measured, and the cumulative value of workload may be estimated based on the measured time. The amount of object data of a data access process and the time for which the corresponding data access process is performed are substantially proportional to each other. Therefore, a map representing the relation between the time for which the data access process is performed and the amount of object data of the data access process obtained by experiments in advance may be obtained, and the amount of object data may be obtained based on a time for which a data access process is performed, with reference to the obtained map and added to the cumulative value of workload so as to update the cumulative value. Alternatively, instead of the map, a predetermined calculation expression may be used to calculate the cumulative value.

D2. Second Modification

In the first and third embodiments, the notifying unit 50 includes the LED lamps 52 and the buzzer 54. However, the notifying unit 50 may include either one of the LED lamps 52 or the buzzer 54. This configuration also notifies the user of the state where the cumulative value of workload is equal to or larger than the threshold, i.e., the state where the probability of failure in the magnetic disk device 100 or 100b is high. Also, in the second embodiment, the LED lamps 52 and/or the buzzer 54 may be included. Also, in the third embodiment, the LED lamps 52 and the buzzer 54 may be omitted. These configurations notify the user of the state where the cumulative value of workload is equal to or larger than the threshold, i.e., the state where the probability of failure in the magnetic disk device 100b is high by displaying "0" as the remaining days on the display unit 56.

D3. Third Modification

In the first and third embodiments, in STEP S250, the state where the cumulative value of workload is equal to or larger than the threshold is notified by flashing the red lamp constituting the LED lamps 52 and by producing predetermined buzzer sound after turning on the buzzer 54. However, the present disclosure is not limited thereto. The state where the cumulative value of workload is equal to or larger than the threshold may be notified by turning on the yellow lamp, and the state where failure has actually occurred may be notified by turning on the red lamp, and the normal state may be notified by turning off all lamps. Alternatively, the state where the cumulative value of workload is equal to or larger than the threshold may be notified by an arbitrary operation different from the operation for notifying the normal state, such as turning on the red lamp, flashing the green lamp, alternately turning on the red lamp and the green lamp, or alternately performing turning on of any one of lamps constituting the LED lamps 52 and turning on the buzzer 54.

D4. Fourth Modification

In the second embodiment, the window W1 including the warning message is displayed on the monitor device 301 of the personal computer 300. However, the present disclosure is not limited thereto. For example, instead of the warning message or in addition to the warning message, the cumulative value of workload and the threshold may be displayed as numerical values or graphics data. Also, in the third embodiment, the remaining days is displayed on the display unit 56. However, instead of the remaining days or in addition to the remaining days, the cumulative value of workload and the threshold may be displayed as numerical values or graphics data on the display unit 56. Further, a warning message may be displayed on the display unit 56. Also, in the third embodiment, instead of display of the remaining days on the display unit 56, or in addition to display of the remaining days on the display unit 56, the remaining days may be displayed on the monitor device 301 of the personal computer 300.

D5. Fifth Modification

In each embodiment, the command input unit 12, the data amount specifying unit 13, the cumulative-data-amount calculating unit 14, the data writing unit 16, the notification control unit 17, and the remaining-period calculating unit 18 may be included in the personal computer 300, not in the magnetic disk device 100, 100a, or 100b. In other words, the CPU of the personal computer 300 may function as those functional units. Also, the functional units of the personal computer 300 may perform the cumulative-value writing process and the warning notification process based on workload. In this configuration, in STEP S130 of the cumulative-value writing process, the cumulative value of workload may be written in the flash ROM 40 included in the magnetic disk device 100, 100a, or 100b, or in a flash ROM included in the personal computer 300. Also, in this configuration, if the personal computer 300 fails, the cumulative value of workload is acquired from the flash ROM 40 included in the magnetic disk device 100, 100a, or 100b, or the flash ROM included in the personal computer 300.

D6. Sixth Modification

In the third embodiment, the remaining days is calculated and is displayed on the display unit 56. However, instead of the remaining days, a remaining time length until the cumulative value of workload will be equal to or larger than the threshold may be calculated in arbitrary units and displayed on the display unit 56. For example, a remaining time length until the cumulative value of workload will be equal to or larger than the threshold may be calculated in minutes, in hours, in weeks, in months, or in years, and displayed on the display unit 56.

D7. Seventh Modification

In each embodiment, some of components implemented by hardware may be replaced with software. On the contrary, some of components implemented by software may be replaced with hardware. Also, in the case where some or all of the functions of the present disclosure are implemented by software, that software (a computer program) can be stored on computer-readable storage media to be distributed. The computer-readable storage media are not limited to portable storage media such as flexible disks and CD-ROMs and include various 1 memory devices, such internal memory device built in computers as a RAM and a ROM, and such external memory device connected to computers as a hard disk drive. In other words, the term "non-transitory computer-readable storage medium" has a broad meaning including an arbitrary storage medium used for storing data for a long time, not temporarily.

D8. Other Modifications

The configurations of the magnetic disk devices 100, 100a, and 100b of the embodiments are merely examples and can be modified in various forms. For example, in the third embodiment, a timing to start display of the remaining days may not be selectable by the user and may be fixed in advance. For example, ten days may be set at a fixed value as a timing to start display of the remaining days, and the fixed value means the number of days until the cumulative value of workload is predicted to be equal to or larger than the threshold. Also, in the cumulative-value writing process of each embodiment, the cumulative value of workload is written in the flash ROM 40 at intervals of a predetermined period; however, it may not be written at intervals of the predetermined period. For example, the cumulative value of workload may be written in the flash ROM 40 at time intervals which gradually decrease. Also, regardless of time, the cumulative value is written in the flash ROM 40 based on the cumulative value of workload. Specifically, for example, each time when the cumulative value of workload increases by 100 MB (megabytes), the cumulative value may be written in the flash ROM 40. In this configuration, time intervals at which the cumulative value of workload is written in the flash ROM 40 can vary. Also, a timing to write the cumulative value of workload in the flash ROM 40 may be determined based on both of time and the cumulative value of workload. Specifically, in the case that the cumulative value of workload is written in the flash ROM 40 at intervals of a predetermined period under predetermined condition, and if an increase in the cumulative value of workload from the previous writing is equal to or larger than a predetermined value at a predetermined writing timing, writing process may be performed; whereas if the increase in the cumulative value is smaller than the predetermined value, writing process may not be performed. This configuration reduces the number of times of writing in the flash ROM 40, and extends the life of the flash ROM 40, as compared to the configuration where the cumulative value of workload is necessarily written in the flash ROM 40 at intervals of the predetermined period. Also, in the magnetic disk device 100, 100*a*, or 100*b*, the platter 32 is included as a magnetic disk. However, instead of the hard disk 30, or in addition to the hard disk 30, any other type of magnetic disk such as a flexible disk or a Zip disk may be included. In this configuration, the threshold can be changed based on the type of the magnetic disk and the reliability of the magnetic disk so that the user can more accurately specify whether the probability of failure in the magnetic disk device is high. Also, in STEP S130 of the cumulative-value writing process of each embodiment, the cumulative value of workload is written in a storage medium (the flash ROM 40) of a type different from that of the hard disk 30. However, the present disclosure is not limited thereto. The magnetic disk device 100, 100*a*, or 100*b* may include a hard disk different from the hard disk 30, and in STEP S130, the cumulative value of workload may be written in the different hard disk. Even in this configuration, for example, it is preferable to perform settings in advance such that the different hard disk is less frequently used than the hard disk 30 and has the sum of seek times (times when the head are on the platter 32) smaller than that of the hard disk 30, and has a life longer than that of the hard disk 30.

The present invention is not limited to the embodiments and the modifications described above but may be implemented in a variety of other configurations without departing from the scope of the present invention. For example, the technical features of embodiments and modifications corresponding to the technical features of the modes described in Summary may be replaced or combined appropriately, in order to solve part or all of the problems described above or in order to achieve part or all of the advantageous effects described above. In addition, where a technical feature is not described as one which is essential in the present specifications, it is able to be removed as appropriate.

The invention claimed is:
1. A magnetic disk device comprising:
  a magnetic disk; and
  circuitry configured to:
    receive a control command for instructing to write data in the magnetic disk or to read the data from the magnetic disk;
    perform a data access process of writing the data in the magnetic disk or reading the data from the magnetic disk according to the received control command;
    specify a data amount of object data of the data access process, the data amount of the object data being data lengths of the object data written in the magnetic disk or read from the magnetic disk;
    calculate a cumulative value of the data amount of the object data from a start of an operation; and
    perform notification when the cumulative value is equal to or larger than a predetermined threshold.
2. The magnetic disk device according to claim 1, wherein the circuitry specifies the data amount of the object data using information representing the data lengths of the object data included in the received control command.
3. The magnetic disk device according to claim 1, wherein the circuitry specifies the data amount of the object data based on an amount of data processed by the circuitry.
4. The magnetic disk device according to claim 1, wherein the circuitry calculates a remaining period to be required until the cumulative value will reach the predetermined threshold, using the cumulative value and a period required to reach the cumulative value, and the circuitry notifies the calculated remaining period.
5. The magnetic disk device according to claim 4, further comprising:
  a user interface for setting a timing to start notification of the remaining period.
6. The magnetic disk device according to claim 1, further comprising:
  a storage medium different from the magnetic disk and configured to store the calculated cumulative value.
7. The magnetic disk device according to claim 6, wherein the circuitry stores the cumulative value in the storage medium at at least one timing among (i) a timing when a predetermined period has elapsed, (ii) a timing when the cumulative value becomes equal to or larger than the predetermined threshold, (iii) a timing when a host device connected to the magnetic disk device performs a process to unmount a drive of the magnetic disk device, and (iv) a timing when the magnetic disk device is physically removed from the host device.
8. The magnetic disk device according to claim 6, wherein the circuitry stores the cumulative value in the storage medium at intervals of a predetermined period, and
wherein the predetermined period gradually decreases.
9. The magnetic disk device according to claim 1, further comprising:
  a notifying unit configured to perform the notification under control of the circuitry.
10. The magnetic disk device according to claim 1, wherein the magnetic disk device is connected to a host device including a display unit, and
wherein the circuitry controls the host device to perform the notification in the display unit.
11. The magnetic disk device according to claim 1, wherein the magnetic disk device is connected to a host device, and wherein the circuitry acquires the data amount of the object data of the data access process from the host device.

12. The magnetic disk device according to claim 1, wherein the magnetic disk device is connected to a host device including a storage medium, and wherein the circuitry stores the calculated cumulative value in the storage medium of the host device.

13. The magnetic disk device according to claim 1, wherein the magnetic disk is a hard disk.

14. The magnetic disk device according to claim 1, wherein the data access process is performed using a magnetic head of the magnetic disk.

15. A magnetic disk control device for controlling a magnetic disk device including a magnetic disk, the control device comprising:
   circuitry configured to:
      receive a control command for instructing to write data in the magnetic disk or to read the data from the magnetic disk;
      perform a data access process of writing the data in the magnetic disk or reading the data from the magnetic disk according to the received control command;
      specify the data amount of object data of the data access process, the data amount of the object data being data lengths of the object data written in the magnetic disk or read from the magnetic disk;
      calculate the cumulative value of the data amount of the object data from a start of an operation; and
      perform notification when the cumulative value is equal to or larger than a predetermined threshold.

16. A magnetic disk control method of controlling a magnetic disk device including a magnetic disk, the control method comprising:
   receiving a control command for instructing to write data in the magnetic disk or to read the data from the magnetic disk;
   performing a data access process of writing the data in the magnetic disk or reading the data from the magnetic disk according to the received control command;
   specifying a data amount of object data of the data access process, the data amount of the object data being data lengths of the object data written in the magnetic disk or read from the magnetic disk;
   calculating a cumulative value of the data amount of the object data from a start of an operation; and
   performing notification when the cumulative value is equal to or larger than a predetermined threshold.

17. A non-transitory storage medium readable by a computer and storing therein a program, when executed by a processor of the computer, controls the computer to perform the magnetic disk control method of claim 16.

18. The magnetic disk device according to claim 1, wherein the circuitry specifies the data amount based on a transfer length included in the control command.

19. The magnetic disk device according to claim 1, wherein the magnetic disk comprises:
   a platter; and
   a hard disc access unit having an arm, the arm being movable on the platter when the data access process is performed, and
wherein the data amount of the object data is transfer data amounts of the object data written in the platter or read from the platter.

* * * * *